(12) United States Patent
Blank et al.

(10) Patent No.: US 7,182,010 B2
(45) Date of Patent: Feb. 27, 2007

(54) APPARATUS AND PROCESS FOR PRODUCING DIFFERENT HOLE PATTERNS IN SHEET-SHAPED PRINT MATERIALS

(75) Inventors: Kurt Blank, Ebersbach (DE); Markus Jenkel, Gernsheim (DE); Eduard Müller, Geislingen-Türkheim (DE); Jürgen Ries, Ostfildern (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 82 days.

(21) Appl. No.: 10/207,492

(22) Filed: Jul. 29, 2002

(65) Prior Publication Data

US 2003/0033916 A1 Feb. 20, 2003

(51) Int. Cl.
*B26D 1/56* (2006.01)
*B26F 1/04* (2006.01)

(52) U.S. Cl. .............................. 83/338; 83/345; 83/628; 83/698.61

(58) Field of Classification Search .................. 234/50; 83/669, 304, 305, 670, 549, 689.61, 345, 83/32, 338, 618, 628, 677, 699, 156, 167, 83/79.6, 346, 348, 37, 698.61, 388, 76.9, 83/624, 684, 698.71; 270/58
See application file for complete search history.

(56) References Cited

U.S. PATENT DOCUMENTS

| | | | | |
|---|---|---|---|---|
| 2,083,370 A | * | 6/1937 | Greulich | ...................... 83/337 |
| 2,098,165 A | * | 11/1937 | Riggenbach | .................. 83/337 |
| 2,116,391 A | | 5/1938 | Gochoel | |
| 2,327,646 A | * | 8/1943 | Hutchinson | ................... 83/550 |
| 2,550,146 A | * | 4/1951 | Gillich et al. | .................. 83/354 |
| 2,797,754 A | * | 7/1957 | Bornemann | ................... 83/337 |
| 3,371,584 A | * | 3/1968 | Zernov | ....................... 493/373 |
| 3,568,554 A | * | 3/1971 | Wiechec | ........................ 83/98 |

(Continued)

FOREIGN PATENT DOCUMENTS

AT 287478 1/1971

(Continued)

OTHER PUBLICATIONS

Abstract for DE 1059333 from Derwent International Patent Family File database (DWPL 2000-483783).

(Continued)

*Primary Examiner*—Boyer D. Ashley
*Assistant Examiner*—Ghassem Alie
(74) *Attorney, Agent, or Firm*—Laurence A. Greenberg; Werner H. Stemer; Ralph E. Locher (57) ABSTRACT

The invention relates to a device for producing different hole patterns in sheet-shaped print materials. An apparatus and process for producing different hole patterns in a sheet-shaped print material is provided wherein a punch in a tool roller is raised and lowered relative to an outer surface of the tool roller in order to effectuate and ineffectuate, respectively, punching by the punch. According to a preferred embodiment, a die roller is provided having a die corresponding with the punch, and sheets are fed through the tool roller and the die roller. In one embodiment punches and dies are provided, and the punches are selectively raised and lowered in order to achieve a desired hole pattern in the sheet.

11 Claims, 5 Drawing Sheets

U.S. PATENT DOCUMENTS

| | | | |
|---|---|---|---|
| 3,741,536 A | 6/1973 | Anderson | |
| 3,877,336 A | 4/1975 | Hillesheimer | |
| 3,949,653 A * | 4/1976 | Schroter | 493/373 |
| 4,051,779 A | 10/1977 | Zaagman | |
| 4,079,647 A * | 3/1978 | Elder et al. | 83/441.1 |
| 4,213,361 A | 7/1980 | Kanervo | |
| 4,227,685 A | 10/1980 | Fischer | |
| 4,367,069 A * | 1/1983 | Bishop | 493/342 |
| 4,442,743 A * | 4/1984 | Szanto | 83/372 |
| 4,594,926 A * | 6/1986 | Propheter | 83/345 |
| 4,607,835 A | 8/1986 | Wilson et al. | |
| 4,685,318 A * | 8/1987 | Ueda et al. | 72/185 |
| 4,691,603 A * | 9/1987 | Winnemoller | 83/151 |
| 4,776,577 A | 10/1988 | Marschke et al. | |
| 4,921,566 A | 5/1990 | Stork | |
| 4,949,607 A | 8/1990 | Yuito | |
| 5,080,340 A | 1/1992 | Hacknauer et al. | |
| 5,088,367 A | 2/1992 | Cracchiolo et al. | |
| 5,162,857 A | 11/1992 | Higeta et al. | |
| 5,511,744 A | 4/1996 | Abe et al. | |
| 5,577,719 A | 11/1996 | Nicoll | |
| 5,662,018 A | 9/1997 | Klein | |
| 5,669,277 A * | 9/1997 | Perrone | 83/37 |
| 5,746,100 A * | 5/1998 | Tsuzaki et al. | 83/13 |
| 5,746,162 A | 5/1998 | Hosoi et al. | |
| 5,774,688 A | 6/1998 | Georgitsis et al. | |
| 5,836,439 A | 11/1998 | Coyette | |
| 5,887,502 A * | 3/1999 | Yamaguchi et al. | 83/76 |
| 5,906,305 A | 5/1999 | Knorr | |
| 5,984,302 A | 11/1999 | Garrone | |
| 6,065,379 A * | 5/2000 | Shinno et al. | 83/30 |
| 6,168,153 B1 | 1/2001 | Richards et al. | |
| 6,179,241 B1 * | 1/2001 | Ba Dour et al. | 242/527.1 |
| 6,220,327 B1 * | 4/2001 | Rothwell et al. | 156/387 |
| 6,230,599 B1 * | 5/2001 | Seay et al. | 83/628 |
| 6,241,242 B1 | 6/2001 | Munro | |
| 6,250,868 B1 | 6/2001 | Schmücker | |
| 6,289,777 B1 * | 9/2001 | Hartmann et al. | 83/30 |
| 6,374,715 B1 * | 4/2002 | Takatsuka | 83/620 |
| 6,391,132 B1 | 5/2002 | Kinnemann et al. | |
| 6,468,453 B1 * | 10/2002 | Gaidjiergis et al. | 264/156 |
| 6,725,751 B1 * | 4/2004 | Surina | 83/49 |
| 2001/0049990 A1 * | 12/2001 | Takaishi et al. | 83/628 |
| 2002/0000149 A1 * | 1/2002 | Miura et al. | 83/628 |
| 2002/0139232 A1 * | 10/2002 | Hsu | 83/549 |
| 2002/0149497 A1 | 10/2002 | Jaggi | |
| 2003/0033915 A1 | 2/2003 | Glemser et al. | |
| 2003/0035143 A1 | 2/2003 | Glemser et al. | |
| 2003/0036468 A1 | 2/2003 | Blank et al. | |
| 2003/0057627 A1 | 3/2003 | Blank et al. | |

FOREIGN PATENT DOCUMENTS

| | | |
|---|---|---|
| DE | 872 949 | 4/1953 |
| DE | 7040410 | 2/1971 |
| DE | 2 139 423 | 3/1972 |
| DE | 2 154 057 | 5/1972 |
| DE | 2 254 281 | 5/1974 |
| DE | 28 11 109 A1 | 9/1978 |
| DE | 27 20 675 A1 | 11/1978 |
| DE | 32 12 971 A1 | 12/1982 |
| DE | 34 27 686 A1 | 5/1985 |
| DE | 34 19 254 C1 | 10/1985 |
| DE | 34 39 199 C1 | 2/1986 |
| DE | 38 05 779 A1 | 9/1988 |
| DE | 37 36 509 A1 | 5/1989 |
| DE | 39 11 698 A1 | 10/1989 |
| DE | 40 30 600 A1 | 4/1992 |
| DE | 43-08-934 A1 | 9/1994 |
| DE | 196 16 945 A1 | 10/1997 |
| DE | 196 42 110 A1 | 4/1998 |
| DE | 198 15 369 A1 | 10/1999 |
| DE | 199 19 345 C1 | 9/2000 |
| DE | 100 49 016 A1 | 4/2001 |
| DE | 100 07 126 A1 | 9/2001 |
| EP | 0 795 502 B1 | 9/1997 |
| EP | 0 864 517 A2 | 9/1998 |
| EP | 1 029 640 A2 | 8/2000 |
| GB | 2 099 797 A | 12/1982 |
| JP | 60-258040 | 12/1985 |
| JP | 63-174733 | 7/1988 |
| JP | 9-29696 | 2/1997 |
| JP | 11-77593 | 3/1999 |
| WO | WO 98/55278 | 12/1998 |
| WO | WO 99/55278 | 11/1999 |

OTHER PUBLICATIONS

Abstract for DE 4417296 from Derwent International Patent Family File database (DIPF 1995-264502).
Abstract for DE 3817463 from Derwent International Patent Family File database (DIPF 1989-349614).
Abstract for EP 1247656 from Derwent International Patent Family File database (DWPL 2003-060789).
Search Report for DE application No. 102 90 090.4 (Feb. 6, 2003).
Translation of relevant portions of DE Search Report for DE application No. 102 90 090.4
U.S. Patent Appl. No. 2002/0011706 A1
Abstract for DE 872949 from esp@cenet (Jan. 28, 2003).
Abstract for DE 2139423 from esp@cenet (Jan. 28, 2003).
Abstract for DE 2154057 from esp@cenet (Jan. 28, 2003).
Abstract for DE 2254281 from esp@cenet (Jan. 28, 2003).
Abstract for DE 2720675 from esp@cenet (Jan. 27, 2003).
Abstract for DE 2811109 from esp@cenet (Jan. 27, 2003).
Abstract for DE 3212971 from esp@cenet (Jan. 28, 2003).
Abstract for DE 3419254 from esp@cenet (Jan. 28, 2003).
Abstract for DE 3427686 from esp@cenet (Jan. 28, 2003).
Abstract for DE 3439199 from esp@cenet (Jan. 21, 2003).
Abstract for DE 3736509 from esp@cenet (Jul. 26, 2002).
Abstract for DE 3805779 from esp@cenet (Jul. 26, 2002).
Abstract for DE 3911698 from esp@cenet (Jul. 26, 2002).
Abstract for DE 4030600 from esp@cenet (Jan. 28, 2003).
Abstract for DE 4308934 from esp@cenet (Jan. 28, 2003).
Abstract for DE 10007126 from esp@cenet (Jan. 21, 2003).
Abstract for DE 10049016 from esp@cenet (Jan. 28, 2003).
Abstract for DE 19616945 from esp@cenet (Jul. 26, 2002).
Abstract for DE 19642110 from esp@cenet (Jul. 26, 2002).
Abstract for DE 19815369 from esp@cenet (Jan. 28, 2003).
Abstract for DE 19919345 from esp@cenet (Jan. 21, 2003).
Abstract for EP 0795502 from esp@cenet (Jan. 28, 2003).
Abstract for EP 1029640 from esp@cenet (Jan. 21, 2003).
Abstract for WO 9855278 from esp@cenet (Jan. 28, 2003).
Patent Abstracts of Japan for 09029696 (Feb. 4, 1997).
Patent Abstracts of Japan for 11077593 (Mar. 23, 1999).
Patent Abstracts of Japan for 60258040 (Dec. 19, 1985).
Patent Abstracts of Japan for 63-174733 (Jul. 19, 1988).
Abstract for DE 2254281 from Derwent International Patent Family File database (DIPF 1974-40062V).
Abstract for DE 2720675 from Derwent International Patent Family File database (DIPF 1978-K0768A).
Abstract for DE 2811109 from Derwent International Patent Family File database (DIPF 1978-H7548A).
Abstract for DE 3212971 from Derwent International Patent Family File database (DIPF 1982-B0299J).
Abstract for DE 3419254 from Derwent International Patent Family File database (DIPF 1985-257288).
Abstract for DE 3427686 from Derwent International Patent Family File database (DIPF 1985-117180).
Abstract for DE 3439199 from Derwent International Patent Family File database (DIPF 1986-056499).
Abstract for DE 3736509 from Derwent International Patent Family File database (DIPF 1989-131601).
Abstract for DE 3805779 from Derwent International Patent Family File database (DIPF 1988-259372).

Abstract for DE 3911698 from Derwent International Patent Family File database (DIPF 1989-310620).
Abstract for DE 4030600 from Derwent International Patent Family File database (DIPF 1992-115342).
Abstract for DE 4308934 from Derwent International Patent Family File database (DIPF 1994-295203).
Abstract for DE 10007126 from Derwent World Patents Legal database (DWPL 2001-502759).
Abstract for DE 10049016 from Derwent International Patent Family File database (DIPF 2001-344674).
Abstract for DE 19616945 from Derwent World Patents Legal databse (DWPL 1997-515259).
Abstract for DE 19642110 from Derwent World Patents Legal databse (DWPL 1998-241408).
Abstract for DE 19815369 from Derwent International Patent Family File database (DIPF 1999-572897).
Abstract for DE 19919345 from Derwent International Patent Family File database (DIPF 2000-566302).
Abstract for JP 09029696 from Derwent International Patent Family File database (DIPF 1997-160284).
Abstract for JP 11077593 from Derwent International Patent Family File database (DIPF 1999-259285).
Abstract for EP 795502 from Derwent International Patent Family File database (DIPF 1997-450774).
Abstract for EP 1029640 from Derwent International Patent Family File database (DIPF 2000-545073).
Abstract for WO 9855278 from Derwent World Patents Legal database (DWPL 1999-045604).
Handbook of Print Media, H. Kipphan (ISBN 3-540-67326-1), Chapter 1, Fundamentals (Springer, 2001) (German edition published and introduced to the market during the book fair in Frankfurt/Main in Oct. 2000).
Handbook of Print Media, H. Kipphan (ISBN 3-540-67326-1), Chapter 7, Print Finishing Processes (Springer, 2001) (German edition published and introduced to the market during the book fair in Frankfurt/Main in Oct. 2000).
Software translation of JP 09-029696 from the Japanese Patent Office.
Software translation of JP 11-077593 from the Japanese Patent Office.
Translation of DE Application No. 101 37 165.9 (priority document).
Translation of DE Application No. 101 46 923.3.
Translation of DE Application No. 101 47 485.7.
Translation of DE Application No. 101 56 375.2 (priority document).
Translation of DE Application No. 102 09 090.4.
Search Report for DE application No. 102 09 090.4 (Feb. 6, 2003).
Search Report for DE application No. 101 37 165.9 (Jun. 25, 2002).
Search Report for DE application No. 101 46 923.3 (Jun. 3, 2002).
Search Report for DE application No. 101 47 485.7 (Sep. 27, 2002).
Search Report for DE application No. 101 56 375.2 (Oct. 10, 2002).
Translation of relevant portions of DE Search Report for DE application No. 101 37 165.9.
Translation of relevant portions of DE Search Report for DE application No. 101 46 923.3.
Translation of relevant portions of DE Search Report for DE application No. 101 47 485.7.
Translation of relevant portions of Search Report for DE application No. 101 56 375.2.

* cited by examiner

APPARATUS AND PROCESS FOR PRODUCING DIFFERENT HOLE PATTERNS IN SHEET-SHAPED PRINT MATERIALS

BACKGROUND

The invention relates to a device for producing different hole patterns in sheet-shaped print materials.

In the printing industry, there is a need to punch print materials, especially in preparation for a binding process, by means of which individually printed sheets can be combined into a brochure or a ring-bound book using a wire comb or plastic binding, or as an alternative method for storing the sheet-shaped print materials, for example, in binders or document covers.

Of the numerous devices and methods known from the prior art for punching holes in sheet-shaped print materials, one group makes up those devices and processes that carry out on-the-fly processing of sheet-shaped print materials. The term on-the-fly processing is understood to mean that the sheet-shaped print materials are processed while moving, in contrast to systems in which several sheet-shaped print materials are punched or cut while stationary. In on-the-fly processing, the sheet-shaped print materials are typically processed individually and then collected, while in other processes the sheet-shaped print materials are first collected and then processed. On-the-fly processing of sheet-shaped print materials has the advantage that this processing better corresponds to the work sequence of a printing machine for sheet-shaped print materials that typically prints the sheet-shaped print materials sequentially. Therefore, on-the-fly processing is suitable for further print processing, especially for in-line devices, as they are called, that are connected directly to a printing machine such as this, for example, a digital printer or copy machine. On-the-fly processing is, however, not tied to in-line devices, rather it can also be advantageously used in off-line devices that are not directly connected with a printing machine.

The hole patterns that are put into sheet-shaped print materials basically differ in the position and number of holes that are punched. This means that a difference is made, for example, between the European 2- or 4-hole pattern or the US 2, 3, 4, 5 or 7-hole pattern.

It is advantageous to design a punching device that is as flexible as possible since the requirements, for example, on the position of the holes or their number, can vary from one printing and/or further processing job to the next. U.S. Pat. No. 2,116,391 discloses a device for flexible adjustment of punching patterns in a punching device. In this case, individual punches are fastened to ring gears that can be moved axially. Because of the ring gears that are additionally equipped with a scale, a precise angular positioning of the punches on the circumference of the ring gear is achieved; the same is true for the positioning of the associated female dies. In the solution named in the document above, the punches are bolted individually in their planned position. Consequently, a flexible change is in fact possible but involves considerable time.

U.S. Pat. No. 5,669,277 suggests a rotary hole-punching device, in which brackets are provided in a first shaft for punches for a number of different hole combinations. Changing between different hole patterns requires putting in or taking out the associated punch from the corresponding bracket. This allows for attaining a high precision of the punch positions. On the other hand, the disadvantage is that the punches have to be changed manually for each change in the punching pattern.

The published German patent application (OLS) DE 34 27 686 A1 discloses a device in which a number of punches are mounted radially on a punching ring of a hole-punching device at specific distances from each other such that the punches can be moved radially by means of internal cam rings between a first outer punching position and a retracted passive position. In addition, the punching rings can be slid on the shaft along the axis so that a large number of different punching patterns can be created. The disadvantage of the solution described is that it is not possible to change the punching patterns while the operation is in progress.

International application WO 98/55278 suggests a method for changing perforation patterns, in which perforation tools are also brought radially out of a passive position and into an active position and thus result in a change in the perforation pattern. For this purpose, the perforation tools are resiliently supported against a hose, whereby the hose winds in a helical or double-helical form around the roller and within the roller holding the tools. Inflating the hose causes the tools to be raised into their active position. The advantage of this design is that it is possible to change between the punch patterns here at any time. On the other hand, the disadvantage is the limited number of different punching patterns that depend on the number of hoses that wind around the roller holding the tools since it is always an entire hose that is inflated.

The published German patent application (OLS) DE 28 11 109 discloses a modular design of a transverse perforation device in which the perforation processes are distributed, i.e., carried out by separate rollers and whereby the spacing of the lateral perforation is controlled by changing the relative position of the rollers with respect to one another. Depending on the number of separate perforation rollers, different perforation patterns can be achieved in this way. The disadvantage here is that a large number of movable parts are necessary.

European patent application EP 1029640 A2 discloses a lateral processing device that has two processing units arranged in succession and thereby represent two successive processing levels, whereby one of the processing units can be selected respectively by using a control. In one embodiment, the lateral processing device is made up of a first synchronous cutter and a directly adjacent dynamic variable cross cutter. According to the disclosure, one of the lateral cutters respectively can be stopped so long as the other one is working. The individual cutter that is stopped in this case forms an opening into which a guide table can be introduced. The optional use of two cross cutters allows for cutting a greater number of different formats. Also, it is suggested there that the same principle can be used, instead of cross cutting, for punching different hole patterns.

When making a series of perforations along one side of a sheet-shaped print material for a ring binding, e.g., wire comb or plastic binding, it is advantageous if the holes are made in the sheet-shaped print material in such a way that the edges of the sheet-shaped print material running perpendicular to these are not damaged. Therefore, it is desirable to provide a punching device with which this is possible and with which the greatest possible available number of different hole patterns can be punched in sheet-shaped print materials and a change between the different hole patterns can be implemented quickly.

SUMMARY OF THE INVENTION

According to one aspect of the invention, an apparatus and process are provided for producing different hole patterns in a sheet-shaped print material. A punch in a tool roller is raised and lowered relative to an outer surface of the tool roller in order to effectuate and ineffectuate, respectively, punching by the punch. The tool rool is passed over a surface of the sheet-shaped print material.

BRIEF DESCRIPTION OF THE DRAWINGS

FIG. 4b presents a schematic detail view of the punching area of FIG. 3a.

DETAILED DESCRIPTION

Various aspects of the invention are presented in FIGS. 1–7, which are not drawn to any particular scale, and wherein like components in the numerous views are numbered alike. Refering now specifically to FIGS. 1a and 1b, sheet-shaped print materials 1 are presented with different hole patterns 3, E2, E4, US3, and US5. FIG. 1a shows the hole pattern 3 for ring bindings using wire comb binding (Wire-O binding, as it is called) or for binding using plastic elements along one side of sheet-shaped print material 1. Sheet-shaped print material 1 has a length L and a width B, whereby the length L indicates the direction of the sheet-shaped print material 1 that runs along the transport path for sheet-shaped print materials through device 40. Here, width B indicates the direction that runs parallel to hole pattern 3. In this direction, the sheet-shaped print material has a leading edge K3 that enters the device first and an opposite trailing edge K4. The punched holes 2 have a fixed spacing BO from each other and a fixed spacing L1 from the trailing edge K4. The punched hole 2 lying closest to the outer edge K1 has a distance B1; the punched hole lying closest to outer edge K2 has a distance B2. These distances K1, K2 depend on the format of sheet-shaped print material 1, but must not exceed a minimum dimension for reasons of material strength to prevent holes from tearing out.

Figure 1A:
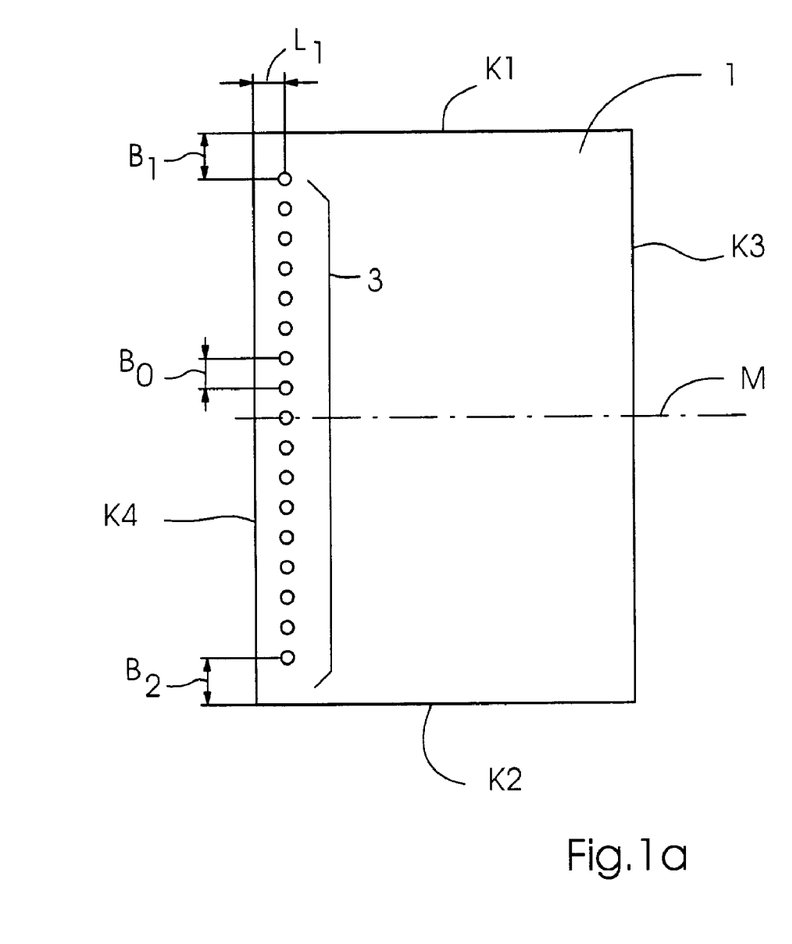
FIG. 1a presents a schematic view of a hole pattern in a sheet-shaped print material for ring bindings.
Figure 1B:
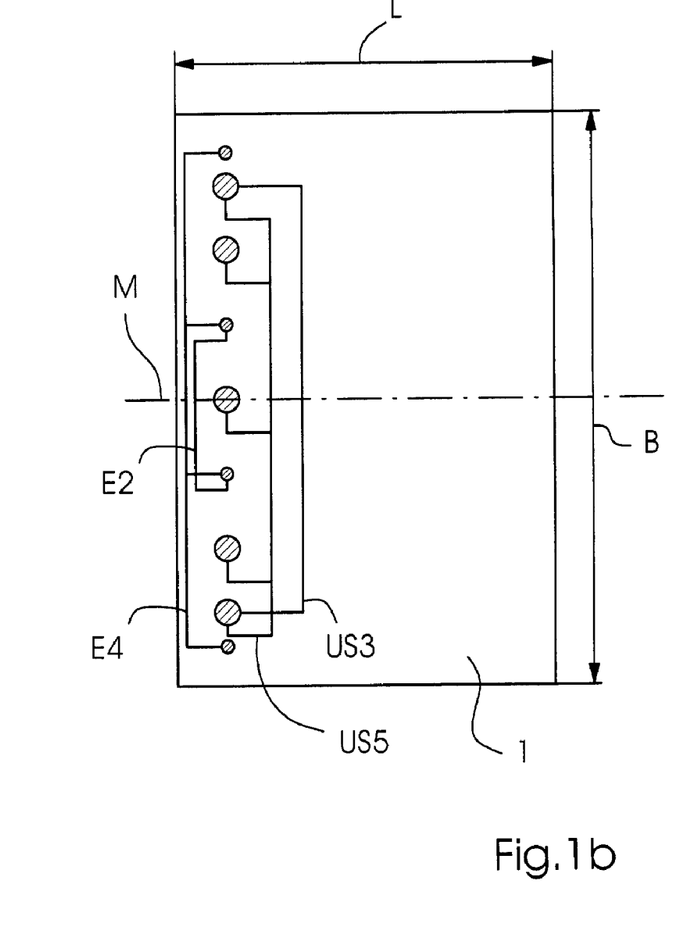
FIG. 1b presents a schematic view of different hole patterns in a sheet-shaped print material.

FIG. 1b shows the arrangement of punched holes 2 with different hole patterns E2, E4, US3, and US5, whereby in this case the European 2-hole pattern E2, the European 4-hole pattern E4, the US 3-hole pattern US3 and the US 5-hole pattern US5 are differentiated. Other hole combinations known to a person skilled in the art can be implemented and lie within the scope of-the invention described here. The exact sizes of the distances of the holes from each other are also known to a person skilled in the art, in the European hole pattern the holes have a diameter of 5 mm, in the Swedish hole pattern 5.5 mm and in the US hole pattern 8 mm. The center line of the sheet-shaped print material is indicated with reference letter M.

FIGS. 2 to 7 show different views of a preferred embodiment, device 40, and are restricted here to representation of the components that are significant for the invention for the sake of clarity. Other generally known drive and/or guide elements and cam plates and electrical circuits implemented in the device are shown only schematically, if at all, and/or described only in a general way.

Figure 2:
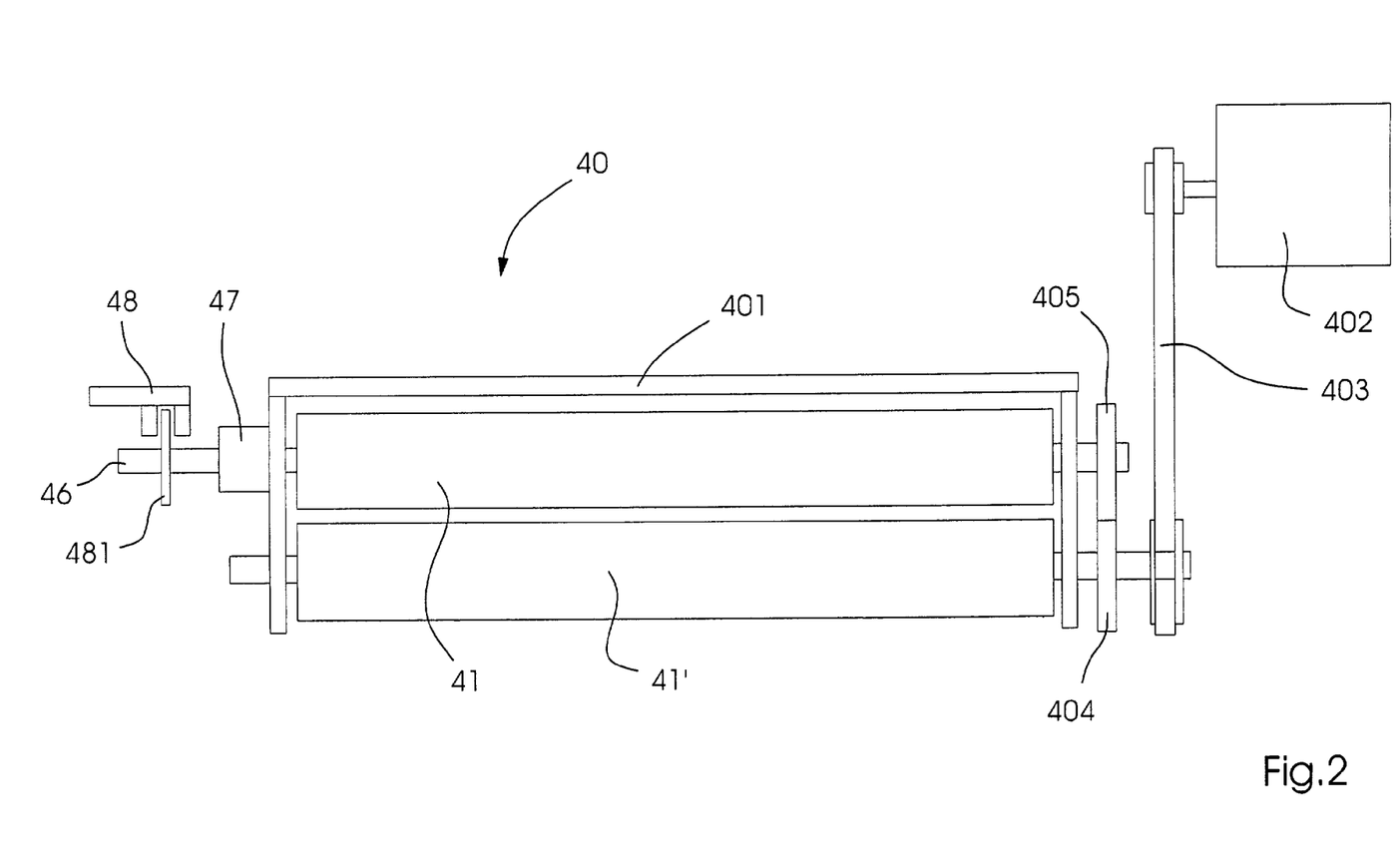
FIG. 2 presents a schematic representation of the functional principle of the device according to the present invention.

As FIG. 2 shows, a die roller 41' is driven by means of a motor 402 using a belt 403. On the axis of the die roller 41', there is a gearwheel 404 that is in engagement with another gearwheel 405 that is mounted on the shaft of the tool roller 41 and transfers the rotation of the die roller 41' synchronously to the tool roller 41 in reverse direction of rotation. Die roller 41' and tool roller 41 are mounted in a housing 401 in opposing relationship. Within the tool roller 41, there is a camshaft 46 that is carried along in the rotation direction of the tool roller 41 so that the rotation of the camshaft exactly corresponds to the rotation of the tool roller 41 in this direction. The camshaft 46 is carried along by means of a ball catch 471 shown in FIG. 3, which by dipping into the recesses 472 provided on the camshaft and shown in FIG. 7, results in a stable coupling between camshaft 46 and tool roller 41.

A freewheel mechanism 47 which is mounted on housing 401 allows the camshaft 46 to rotate in only one direction. When the rotation direction of tool roller 41 is reversed, camshaft 46 is supported against housing 401, whereby a relative rotation of tool roller 41 with respect to camshaft 46 occurs. The ball catch 471 engages in the new functional position of camshaft 46 such that the camshaft 46 is securely carried along by rotation of tool roller 41 when the rotation direction of tool roller 41 is reversed again.

The functional position of camshaft 46 is monitored by a sensor and transmitted to a higher level control (not shown) that is known to a person skilled in the art. For this purpose, a marking 481 is provided on the camshaft in order to allow for determining the functional position of the camshaft, for instance, in the form of an aperture 481. In this case, the sensor 48 is an optical sensor 48.

Figure 3:
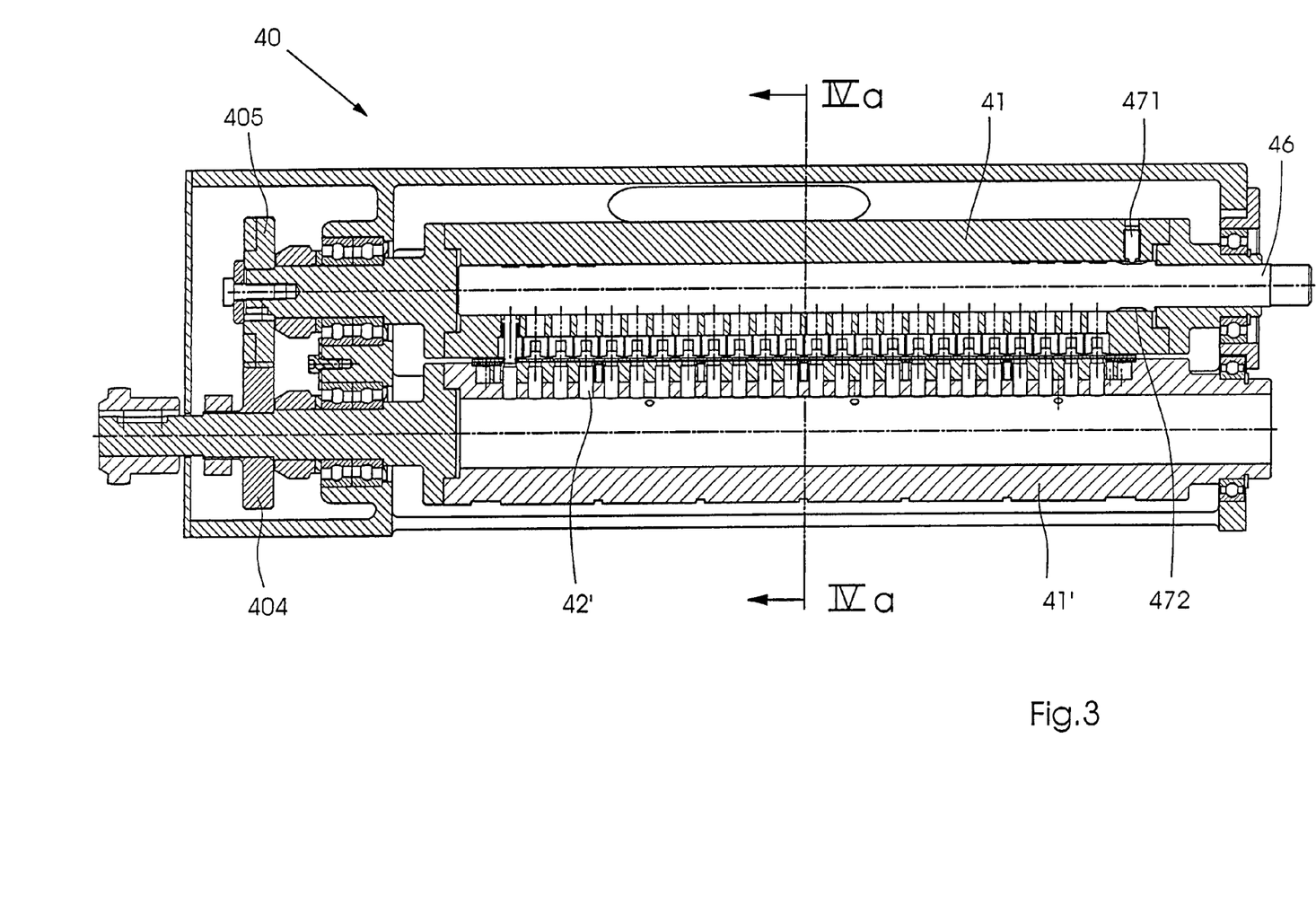
FIG. 3 presents a schematic cross section along the axes of the rollers of a preferred embodiment of the device according to the present invention.

FIG. 3 shows a cross section of the inner structure of tool roller 41 and die roller 41'. In this case, it is a punch arrangement in which the punches 42 maintain a constant distance from one another. In the case of a different hole pattern 3, E2, E4, US3, and US5, the punches have correspondingly different positions on the tool roller 41. Also, an embodiment is conceivable in which the punches 42 for different hole patterns 3, E2, E4, US3, and US5 are mounted on opposing sides of tool roller 41.

Figure 4A:
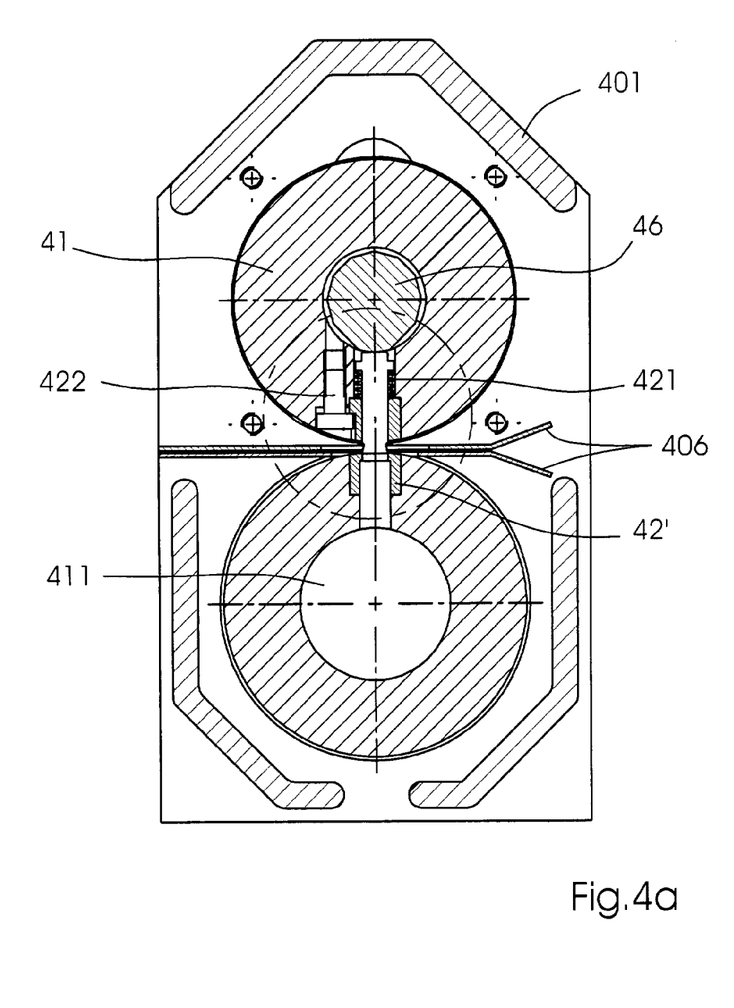
FIG. 4a presents a schematic cross section perpendicular to the axes of the rollers of a preferred embodiment of the device according to the present invention.

As shown in FIG. 4a, the inside 411 of die roller 41' is hollow such that punchings which automatically fall through the dies 42' opening downwards into the inside 411 of die roller 41' are transported laterally out of the device 40 into a suitable waste collection fixture (not shown) that is known to a person skilled in the art.

Figure 4B:
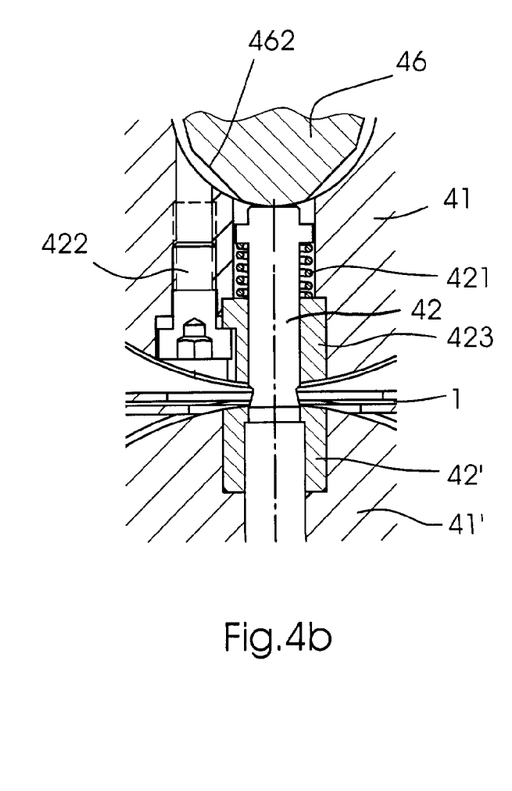

As can be seen in FIG. 4a and FIG. 4b, the punches are mounted so that they can slide in a punch mounting 423. The punch mounting is fastened to the tool roller 41 with a screw 422. In the process, the screw 422 presses the punch mounting 423 against a stop in tool roller 41. The punches 42 are supported with the aid of springs 421 against the surface of camshaft 46 and in particular at least partially against the surface of cams 461. The geometry of cams 461 and the cam surface segments 462 are shown by way of example in FIG. 7. Depending on the functional position of camshaft 46, the punches 42 with their cutter are slid over the circumference of tool roller 41 and dip in contact with the die roller 41' into the die 42', and in this process punch holes 2 in sheet-shaped print material 1.

During transport through the device 40 according to the present invention, sheet-shaped print material 1 is guided through two guide plates 406. The guide plates 406 have openings in the area of the punches 42 and a section turned outward in the area of the inlet of sheet-shaped print materials 1 into device 40, which ensures secure transport through the device 40. This is one example of a through-feed path, since numerous variations are apparent from the art in light of the description provided herein.

Figure 5:
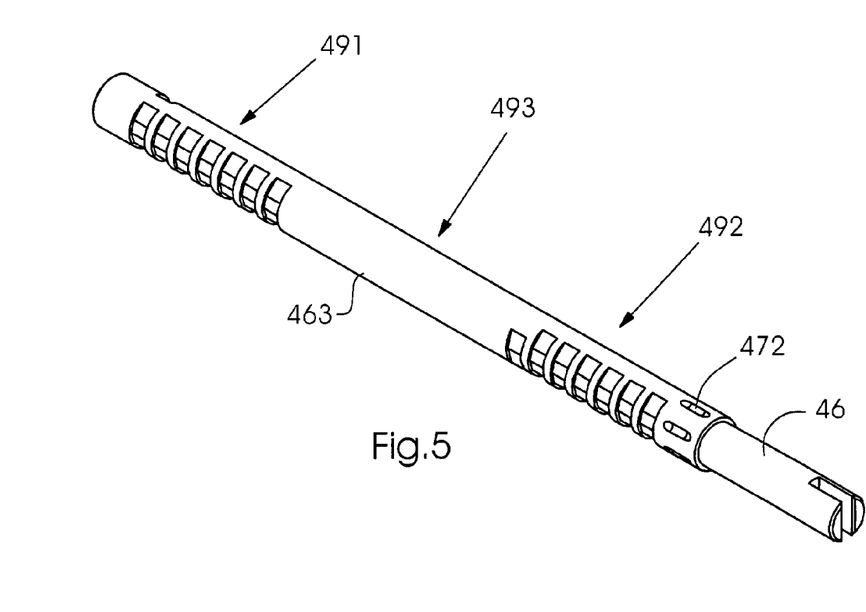
FIG. 5 presents a schematic representation of an exemplary embodiment of a tool roller for a punching module.
Figure 6:
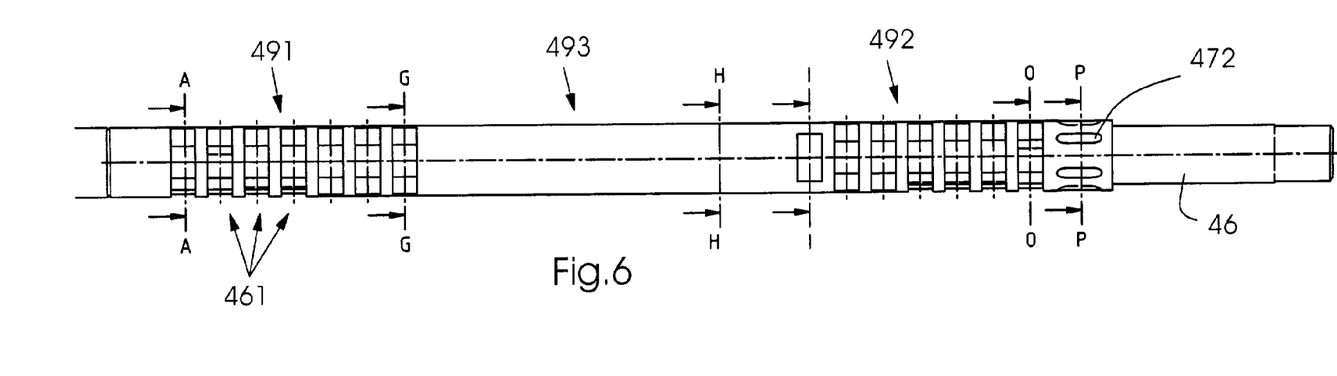
FIG. 6 presents a schematic representation of an exemplary embodiment of a camshaft.
Figure 7:
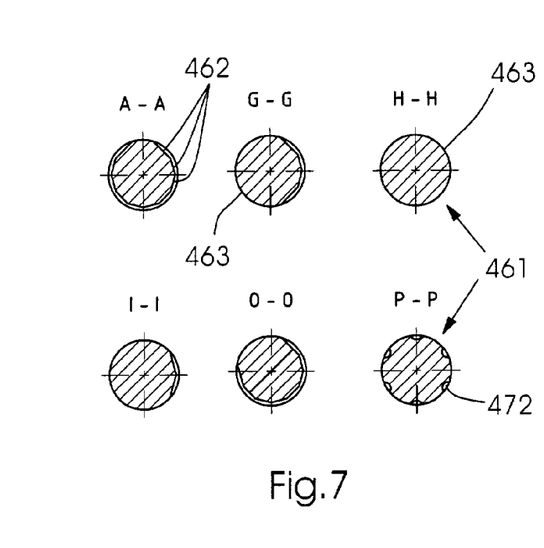
FIG. 7 presents a schematic representation of various cross sections of the camshaft according to FIG. 6.

As FIGS. 4a, 4b, and 5 show, the camshaft 46 consists of a rod that has cam surface segments 462 that are lowered, segmented and planar in sections in specific areas. In this embodiment, three portions 491, 492, 493 can be differentiated in camshaft 46. No cams 461 are provided in the center portion 493 and the camshaft 46 has a round straight-through profile. The punches 42 that are spring-mounted in the center portion 493 against camshaft 46 are always in a raised state and, thus, contribute to producing holes with each revolution of the punch roller. In a first outer portion 491 and a second outer portion 492, the camshaft 46 has, on the other hand, the said cams 461, whereby the punches 42 can be lowered into the tool roller 41. The cam surface segments 462 are arranged with respect to one another such that the cam surface segments 462 with which the punches 42 are in contact when the camshaft 46 is in a functional position have the same angular position along camshaft 46. The number of possible functional positions of camshaft 46 is given by the number of engagement options into the catch recess 472 of the ball catch 471. In the embodiment shown here, this involves 6 engagement options, in a preferred embodiment a larger number of engagement options is provided on camshaft 46 so that all the punches 42 that are assigned to the outer portions 491, 492 can be lowered selectively and thus it is possible to produce a large number of different formats of the sheet-shaped print material 1.

In the normal position of camshaft 46 relative to the tool roller 41, all punches 42 are in a raised state such that the number of holes, which in a sheet-shaped print material transported through the device 41 according to the present invention corresponds exactly to the maximum number of punches 42 on the tool roller 41, which in this embodiment is exactly 24.

The surfaces of the cam surface segments 462 are arranged along camshaft 46 in such a way that, during a relative rotation of the camshaft 46 by one cam surface segment 462, the outermost punch 42 of the first outer portion of camshaft 491 is lowered. Because of this, the series of raised punches 42 that still remains raised is reduced by one punch 42, which in this case leaves exactly 23. In order to achieve a symmetrical hole pattern in a sheet-shaped print material 1 that is supplied, a higher level control that is not shown must now offset the following sheet-shaped print material 1 from the center line of the transport path of sheet-shaped print materials 1 through the device 40 according to the invention in such a way that the distances B1, B2 of the two outermost punches 42 of the uninterrupted series of raised punches 42 that extends from the center portion 493 of camshaft 46 into the outer portions 492, 493 of camshaft 46 are equal to the edges K1, K2 of sheet-shaped print material 1.

The surfaces of the cam surface segments 462 are also arranged along camshaft 46 in such a way that during another relative rotation of camshaft 46 by one cam surface segment 462, the outermost punch 42 of the second outer portion of camshaft 492 is lowered and the outermost punch 42 of the first outer portion of camshaft 491 remains lowered. Because of this, the remaining uninterrupted series of raised punches 42 is reduced by another punch 42, which in this case leaves 22 punches. With another relative rotation of camshaft 46 by one cam surface segment 462, the next innermost punch 42 may be lowered alternately in the outer portions 491, 492 (alternating between the two) so that the remaining uninterrupted series of raised punches 42 is continuously reduced by another punch 42 that extends from the center portion 493 of camshaft 46 into the outer portions 492, 493 of camshaft 46, so long as the uninterrupted series of raised punches 42 has been reduced to the number of raised punches 42 in the center portion 493, preferably to 10 punches 42. The position of the punches 42 in the outer portions 491, 492 of the camshaft, which lie outside the uninterrupted series of raised punches 42 and do not limit it is optional, i.e. the punches can optionally be in a lowered or raised state.

The device described here for producing different hole patterns in sheet-shaped print materials is used especially in in-line further processing of print products of digital printing machines. Use in all copiers/printers in which sheet-shaped print materials are subsequently processed is also possible, especially including use in off-line further processing. Numerous variations and modifications of the invention are evident in light of the description provided herein.

The punches may be resiliently supported on the surface of the cams move, by the rotation of the camshaft relative to the tool roller, the punches assigned to the cam surface move into lowered and raised positions.

A control and memory may be provided, with the aid of which the change between the different hole patterns occurs automatically according to an instruction stored in the memory element. The instruction can be inputted by an operator during set-up of the printing and/or further processing procedure or given by a control which determines by means of sensors what format the incoming sheet-shaped print material has and determines based on that what hole pattern will be punched in the sheet-shaped print material and accordingly which punch on the tool roller will be brought into a lowered or raised position by means of the cams on the camshaft. Also, the instruction can be provided by way of the format of the sheet-shaped print material and the corresponding hole pattern by an apparatus mounted before the device according to the present invention which transfers the sheet-shaped print material to the device. Also, a central control unit that coordinates the entire printing and/or further processing procedure can issue the instruction. In this way, it is not necessary for an operator to intervene in order to change the hole pattern of the device while operation is in progress.

The surface of the cams may be formed in sections of a plurality of segmented planar surfaces that are adjacent to one another, whereby the surfaces which are in contact with the rear side of the corresponding punch are located within the circumference of the camshaft. The cams outside the peripheral section with segmented planar surfaces form an arc with a fixed radius that advantageously corresponds to the radius of the camshaft. In this case, the radius represents the maximum distance between the points on the individual segmented cam surfaces and the axis of the camshaft. However, in the same way, it is also possible to realize a radius of the camshaft and/or of the section of the cam curve formed as an arc that represents a minimum between the points on the individual segmented cam surfaces and the axis of the camshaft. In such a case, the functional principle would be the reverse and the punches would be in a lowered position if they are in contact with the non-segmented arc-shaped surface of the cams.

The cam curve may be divided into segmented, planar levels since this results in more stable support points for the punches on the camshaft than would be possible with a non-segmented cam surface. In addition, the production of segmented, planar, secant-equivalent recesses in the camshaft is especially simple and cost-effective.

The rotation of the tool roller and the camshaft may be coupled by means of a freewheel mechanism so that a rotation moves the camshaft and the tool roller in the same direction, but only the tool roller is moved in the opposite direction. During rotation in the other direction, the camshaft engages with the housing. In the same way, a reversed functional principle is also possible in which only the camshaft continues to turn, whereas the tool roller is at rest in order to achieve a relative rotation between camshaft and tool roller. Because of the freewheel mechanism, the tool roller and the camshaft can be driven in an especially advantageous manner with a single motor and gear ratio and at the same time the relative angular position between tool roller and camshaft can be changed, whereby the different functional positions of the camshaft can be controlled.

In one direction of rotation, the drive of the punching device may be used to make the hole pattern in a sheet-shaped print material that is passing through the device. In order to ensure a uniform hole pattern for subsequent print materials, the camshaft must move synchronously with the tool roller, which is ensured by the camshaft being simply carried along with the rotation of the tool roller. As a result of the freewheel mechanism, it is possible to move the camshaft relative to the tool roller into a new functional position by reversing the direction of rotation. In this way, the position of at least one or more punches changes because of the nature of the camshaft from a lowered position to a raised position or vice versa, which leads to a new hole pattern. When the direction of rotation reverses again, the camshaft is carried along with the tool roller, which causes the punching of the modified hole pattern in a sheet-shaped print material in the new relative angular position between camshaft and tool roller.

The functional position of the camshaft may be monitored by means of a sensor and a marking. In the process, the marking is developed, for instance, by a perforated disk that rotates along with the camshaft and is evaluated by an optical sensor. In addition, a magnetic marking with a corresponding sensor is conceivable.

The sheet-shaped print materials may be processed irrespective of their format in such a way that the center line of the sheet-shaped print materials essentially coincides with the center line of the transport path of the sheet-shaped print materials through the device. In this way, it is possible to ensure a symmetrical punching of a hole pattern in the sheet-shaped print material without having to change the lateral position of the tool and die rollers.

The punch positions may be positioned on the tool roller such that the punches are at a constant distance from each other along the tool roller. In this embodiment, the punches are provided to produce a hole pattern for a ring binding utilizing a plastic or wire comb binding. In this binding technique, the hole pattern of sheet-shaped print materials of various formats is distinguished essentially because of the number of holes that are made along one side of the sheet-shaped print material. This means that a specific number of punches depending on the smallest format that can be processed with the device according to the present invention have to be available at all times for producing holes in the sheet-shaped print material based on the hole pattern for ring bindings. In the process, however, preferably the respective punch does not make a hole in the edge of the sheet-shaped print material, since this contributes to an undesirable negative effect on the appearance of a brochure that is ring-bound with wire comb or plastic elements. The punches that would damage the edge of the sheet-shaped print material or do not have a minimum distance from the edge of the sheet-shaped print material are preferably able to be lowered, therefore, if required based on the format of the sheet-shaped print material. The minimum distance between the hole and the edge of the sheet-shaped print material results from stability considerations for ensuring that the holes in the bound brochure do not tear out.

The apparatus may have a center portion, whereby in the center portion no cams are assigned to the punches of the tool roller and has a first outer portion of the camshaft and a second outer portion of the camshaft, whereas cams are assigned to the punches in the outer portions of the camshaft. The punches in the center portion cannot, therefore, be lowered. Consequently, this allows for eliminating superfluous manufacturing costs. In the first and second outer portion of the camshaft, the punches assigned to these portions can be brought, in cooperation with the cams of the camshaft, into a lowered or raised position. Viewed from the center portion towards the outside, the punches that are assigned to the cams on the outer portions of the camshaft are then in a raised position if, depending on the format of the sheet-shaped print material, they have at least a minimum distance between the hole to be punched and the edge of the sheet-shaped print material. In addition, the punches that do not have this minimum distance are lowered such that the sheet-shaped print material is not punched in the area of the minimum distance from the edge of the sheet-shaped material. Beyond the edge of the sheet-shaped print material it does not matter if the punch is lowered or raised, since the punch generally does not come in contact at all with the sheet-shaped print material.

In an advantageous embodiment of the device according to the present invention, the surfaces of the cams in the first outer portion of the camshaft and the second outer portion of the camshaft are arranged in such a way that, during relative rotation of the camshaft with respect to the tool roller, the punches that are assigned to the cams of the first outer portion of the camshaft and to the second outer portion of the camshaft are lowered or raised, whereby an uninterrupted series of raised punches appears on the tool roller, which extends from the center portion of the camshaft into the first outer portion of the camshaft and the second outer portion of the camshaft to the innermost lowered punches that is assigned to the cams of the outer portions. This uninterrupted series of raised punches is limited laterally either by a lowered punch or ends with the outermost punch of the respective outer portion. Outside the limit of the uninterrupted series of raised punches, any punches that may remain in outer portions can be either lowered or raised. The uninterrupted series of raised punches corresponds precisely to the number of holes that have to be made based on the format for producing the desired hole pattern along the edge of the sheet-shaped print material.

The surfaces of the cams in the first outer portion of the camshaft and the second outer portion of the camshaft may be arranged in such a way that by relative rotation of the cam surface of the camshaft with respect to the tool roller by one segment of the cam surface, the uninterrupted series of raised punches on the tool roller is reduced by at least one punch, whereas the lowered punch on the tool roller limiting the uninterrupted series of raised punches in each case is lowered alternately in the first outer portion of the camshaft and in the second outer portion of the camshaft until the uninterrupted series of raised punches on the tool roller corresponds to the raised punches that are assigned to the center portion of the camshaft. The punches that may have represented the delimitation of the uninterrupted series of raised punches on the tool roller before the rotation of the cam surface of the camshaft with respect to the tool roller by one segment of the cam surface, can then either remain lowered or, after rotation of the cam surface of the camshaft with respect to the tool roller by one or more additional segments of the cam surface, can be moved into a raised state. An adjustment of the cam surfaces that allows for lowering several punches during the rotation by one segment makes sense if the sheet-shaped print materials to be processed in this format area require, for instance, only a rough graduation, say of the change between a perforation in longitudinal direction and a perforation along the width of a sheet-shaped print material of the format A4.

A depository may be mounted upstream to supply the sheet-shaped print material in such a way that the print material is offset from the center line of the transport path of the sheet-shaped print material through the device so that the uninterrupted series of raised punches on the tool roller makes a hole pattern in the sheet-shaped print material in which the distance of the outermost punches to the corresponding edges of the sheet-shaped print material is essentially equal. As a result, a symmetrical hole pattern is always produced in the sheet-shaped print material. This is especially desirable either if there is an odd number of punches or an even number of punches in the uninterrupted series of raised punches on the tool roller depending on how the punches are positioned on the tool roller relative to the center line of the transport path of the sheet-shaped print material through the device. If in one case, the innermost punch lies, for example, on the center line of the transport path, an even number of punches in the uninterrupted series of raised punches on the tool roller requires a corresponding lateral offset of the incoming sheet-shaped print materials with respect to the center line of the transport path, in order to ensure an equal spacing of the outermost holes that are punched in the sheet-shaped print material with respect to the edges of the sheet-shaped print material. On the other hand, with an odd number of punches in the uninterrupted series of raised punches on the tool roller, a sheet-shaped print material supplied on the center line of the transport path in this exemplary case would automatically result in a symmetrical hole pattern with respect to the edges of the sheet-shaped print material because of the arrangement of the punches on the tool roller.

In doing so, the form of the holes depends only on the punches, whereby square, round or oval holes are possible, depending on the application, and lie within the scope of the invention explained here.

Instead of a hole pattern for a ring binding using plastic elements or a wire comb binding, different hole patterns may be provided to allow for storage of the sheet-shaped print materials in binders or document covers. For this purpose, the punches are positioned on the tool roller, and the cam surfaces on the camshaft in such a way that their position corresponds to the US 2-hole pattern or the US 3-hole pattern or the US 4-hole pattern or the US 5-hole pattern or the US 7-hole pattern or the European 2-hole pattern or the European 4-hole pattern and that a relative rotation of the camshaft with respect to the tool roller allows for a change between at least two of these hole patterns. The European and the US hole patterns differ in the diameter of the holes, in addition to their positions.

Although the invention has been described and illustrated with reference to specific illustrative embodiments thereof, it is not intended that the invention be limited to those illustrative embodiments. Those skilled in the art will recognize that variations and modifications can be made, in addition to those specifically noted, without departing from the true scope and spirit of the invention as defined by the claims that follow. It is therefore intended to include within the invention all such variations and modifications as fall within the scope of the appended claims and equivalents thereof.

What is claimed is:

1. An apparatus for producing different hole patterns in a sheet-shaped print material, comprising:
    a tool roller having a punch and a cam engaging said punch wherein movement of said cam permits lowering said punch relative to an outer surface of said tool roller;
    a die roller opposing said tool roller in operative engagement therewith, said die roller having a die corresponding with said punch;
    wherein said cam is coupled with said tool roller, and further comprising a freewheel coupled with said cam, wherein rotation in one direction rotates both said cam and said tool roller together, and movement in an opposite direction rotates said tool roller relative to said cam.

2. An apparatus for producing different hole patterns in a sheet-shaped print material, comprising:
    a tool roller having punches and a camshaft disposed within said tool roller, said camshaft having cams engaging said punches wherein movement of said camshaft disposed within said tool roller permits lowering said punches relative to an outer surface of said tool roller by a relative rotation of said camshaft with respect to said tool roller;
    a die roller opposing said tool roller in operative engagement therewith, said die roller having dies corresponding with said punches; and
    a through-teed path passing between said tool roller and said die roller for sheet-shaped print material.

3. The apparatus of claim 2, wherein said punches are resiliently supported against surfaces of said cams.

4. The apparatus of claim 2, further comprising a control and memory, for lowering of said punches is carried-out by an instruction stored in said memory.

5. The apparatus of claim 2, wherein said cams have surfaces comprising a number of segmented planar surfaces adjacent to one another, said surfaces contacting a back side of said punches.

6. The apparatus of claim 2, wherein said camshaft is coupled with said tool roller, and further comprising a freewheel coupled with said camshaft, wherein rotation in one direction rotates both said camshaft and said tool roller together, and movement in an opposite direction rotates said tool roller relative to said camshaft.

7. The apparatus of claim 2, further comprising a sensor and a marking that indicates a position of said camshaft.

8. An apparatus for producing different hole patterns in a sheet-shaped print material, comprising:
    a tool roller having punches and a camshaft disposed within said tool roller, said camshaft having cams engaging said punches wherein movement of said camshaft disposed within said tool roller permits lowering said punches relative to an outer surface of said tool roller and said camshaft has a center portion having no said cams, and a first outer portion and a second outer portion having said cams;

said punches including a first outer set of punches, a second outer set of punches, and a center set of punches therebetween and wherein rotation of said cams positions said first outer set of punches and said second outer set of punches resulting in an uninterrupted series of raised punches extending from said center portion to an innermost punch in each of said first outer set of punches and said second outer set of punches;

a die roller opposing said tool roller in operative engagement therewith, said die roller having dies corresponding with said punches; and a through-feed path passing between said tool roller and said die roller for sheet-shaped print material.

9. The apparatus of claim 8, wherein a length of said uninterrupted series of raised punches is adjusted to a page size of the sheet-shaped print material so that a desired distance remains between outermost punches of said uninterrupted series of raised punches and corresponding edges on opposing sides of the sheet-shaped print material.

10. The apparatus of claim 8, wherein rotation of said cams lowers punches alternating between said first outer portion and said second outer portion thereby reducing said length of said uninterrupted series of raised punches.

11. The apparatus of claim 2, wherein said punches are arranged along said tool roller and said cams along said camshaft in such a way that their positions correspond to at least two from the group consisting of a US 2-hole pattern, a US 3-hole pattern, a US 4-hole pattern, a US 5-hole pattern, a US 7-hole pattern, a European 2-hole pattern, and a European 4-hole pattern, and that a relative rotation of said camshaft with respect to said tool roller changes between at least two of these hole patterns.

* * * * *